(12) United States Patent
Silvi

(10) Patent No.: US 12,319,813 B2
(45) Date of Patent: Jun. 3, 2025

(54) ELECTRICALLY CONDUCTIVE MICROWAVE SHIELDING COMPOSITIONS

(71) Applicant: SHPP GLOBAL TECHNOLOGIES B.V., Bergen op Zoom (NL)

(72) Inventor: Norberto Silvi, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 18/269,635

(22) PCT Filed: Dec. 28, 2021

(86) PCT No.: PCT/IB2021/062397
§ 371 (c)(1),
(2) Date: Jun. 26, 2023

(87) PCT Pub. No.: WO2022/144777
PCT Pub. Date: Jul. 7, 2022

(65) Prior Publication Data
US 2024/0084132 A1    Mar. 14, 2024

(30) Foreign Application Priority Data
Dec. 29, 2020    (EP) ..................................... 20217686

(51) Int. Cl.
*C08L 71/12*    (2006.01)
*C08K 3/04*    (2006.01)

(52) U.S. Cl.
CPC ................ *C08L 71/12* (2013.01); *C08K 3/04* (2013.01); *C08K 2201/001* (2013.01);
(Continued)

(58) Field of Classification Search
CPC ............ H01B 1/24; C08L 71/12; C08L 77/06
See application file for complete search history.

(56) References Cited

U.S. PATENT DOCUMENTS

| 3,306,874 A | 2/1967 | Hay |
| 8,025,158 B2 | 9/2011 | Delsman et al. |

(Continued)

FOREIGN PATENT DOCUMENTS

| CN | 1381528 A | 11/2002 |
| CN | 106751712 A | 5/2017 |

(Continued)

OTHER PUBLICATIONS

Al-Saleh et al. "EMI shielding effectiveness of carbon based nanostructured polymeric materials: A comparative study". Carbon, vol. 60, 2013, pp. 146-156.

(Continued)

*Primary Examiner* — Khanh T Nguyen
(74) *Attorney, Agent, or Firm* — Quicker Law, LLC

(57) ABSTRACT

A thermoplastic composition includes: (a) from about 82 wt % to about 92 wt % of a thermoplastic resin including poly(phenylene ether) and polystyrene; and (b) from about 3 wt % to about 13 wt % of a carbon-based filler. The carbon-based filler has a specific surface area of at least 650 square meters per gram (m2/g) and an Oil Absorption Number of at least 250 milliliter per 100 gram (ml/100 g). The composition has a dielectric constant ε' of between 3.5 and 10 and a dissipation loss ε" of between 0.25 and 5, as measured at a frequency of between about 75 gigahertz (GHz) and about 110 GHz. A ⅛-inch-thick molded sample of the composition exhibits a Percent Absorbed Power measured in Transmission mode of at least 50% when observed according to a Free Space method at frequencies from about 75 GHz to about 110 GHz.

13 Claims, 12 Drawing Sheets

(52) U.S. Cl.
CPC .. *C08K 2201/006* (2013.01); *C08K 2201/014* (2013.01); *C08L 2203/20* (2013.01); *C08L 2205/03* (2013.01)

(56) References Cited

U.S. PATENT DOCUMENTS

| | | |
|---|---|---|
| 2003/0139518 A1 | 7/2003 | Miyoshi et al. |
| 2019/0352503 A1* | 11/2019 | Cheng .................. C08L 71/123 |

FOREIGN PATENT DOCUMENTS

| | | | |
|---|---|---|---|
| EP | 1854845 A1 | 11/2007 | |
| JP | H02-180958 A | 7/1990 | |
| JP | H05-271532 A | 10/1993 | |
| JP | H07-207142 A | 8/1995 | |
| JP | H07-316418 A | 12/1995 | |
| JP | H 1180536 A * | 3/1999 | ............. C08K 13/02 |
| JP | 2003-073541 A | 3/2003 | |
| JP | 2005162961 A * | 6/2005 | ............. C08L 71/12 |
| JP | 2012-121939 A | 6/2012 | |

OTHER PUBLICATIONS

Zhang et al. "Facile Preparation of Electronmagnetic Interference Shielding Materials Enabled by Constructing Interconnected Network of Multi-walled Carbon Nanotubes in a Miscible Polymeric Blend." Chinese J of Polymer Sci, vol. 38, 2019, pp. 593-598.
International Search Report and Written Opinion mailed Jan. 31, 2022 in PCT/IB2021/062397 (11 pgs.).

* cited by examiner

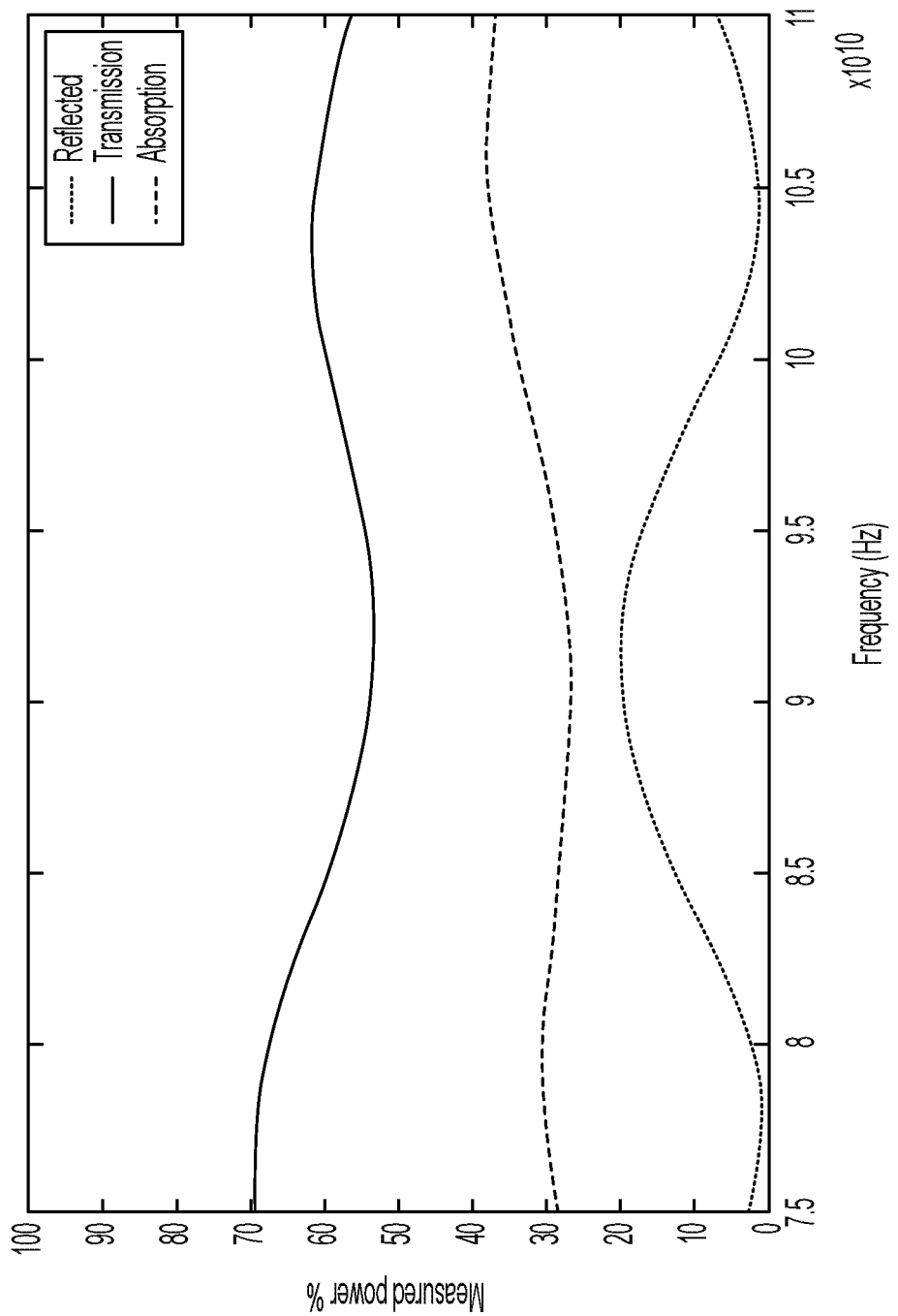

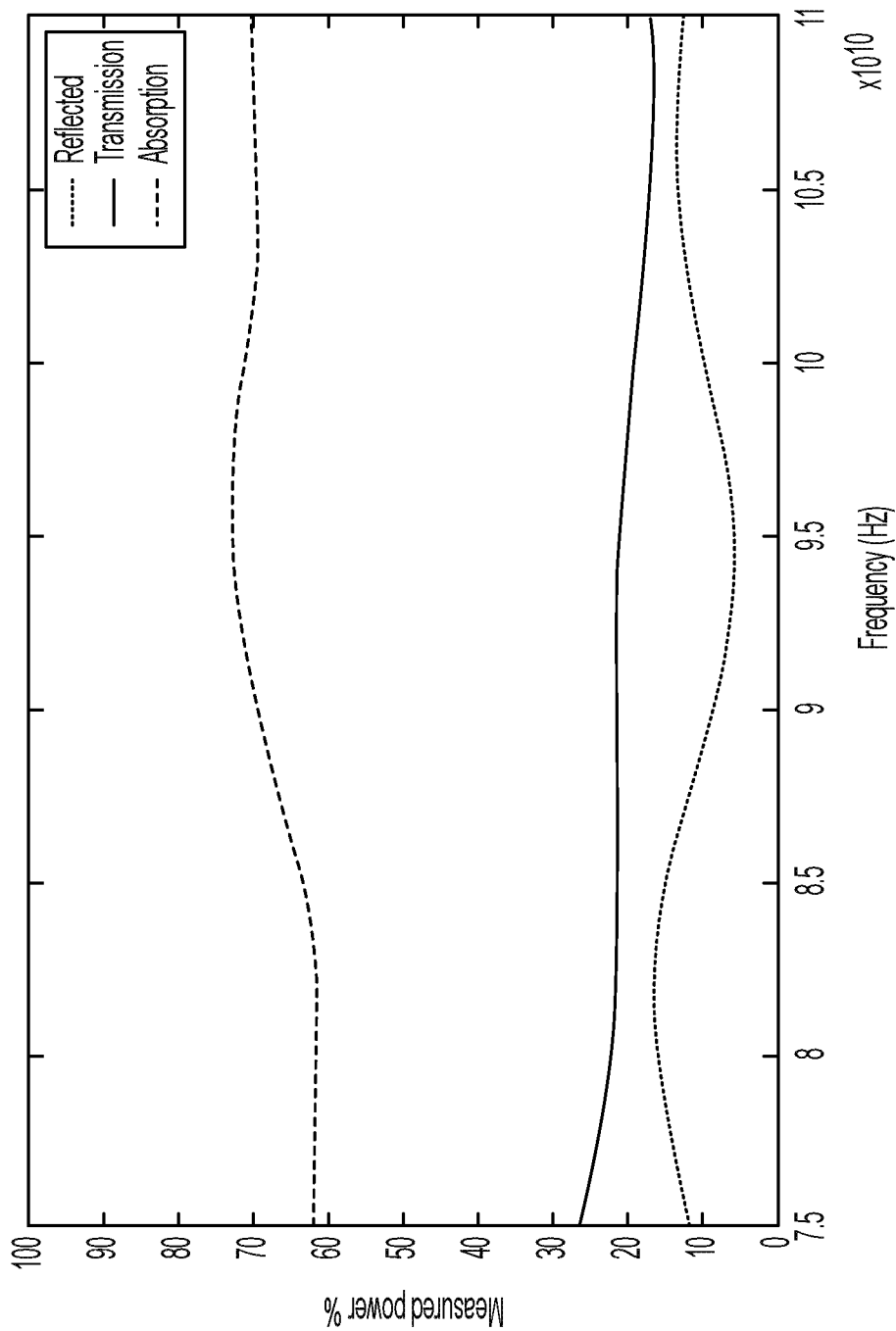

ELECTRICALLY CONDUCTIVE MICROWAVE SHIELDING COMPOSITIONS

CROSS-REFERENCE TO RELATED APPLICATION

This application is the National Stage of International Application No. PCT/IB2021/062397 filed Dec. 28, 2021, which claims priority to and the benefit of European Application No. 20217686.3 filed Dec. 29, 2020, the disclosures of which are incorporated herein by this reference in their entireties.

FIELD OF THE DISCLOSURE

The present application relates to poly(phenylene ether)-based compositions including carbon black that have good dielectric properties.

BACKGROUND OF THE DISCLOSURE

The automotive industry is increasingly making use of electronic radar sensors to provide drivers assistance with features such as adaptive cruise control, parking/lane change assist, back-up warning, blind spot detection, collision avoidance, and many others. These radar sensors operate at relatively high frequencies, preferably at around 24 GHz (short-range radars, 10-20 meters) and at around 77 GHz (long-range radars, 150-200 meters). For these sensors to operate effectively they need to be protected from spurious sources of electromagnetic radiation. Metals such as aluminum and stainless steel are the most common materials used for microwave (MW) shielding, but they are heavy, expensive and require complex processing to be shaped into a final part. Polymer/carbon composites have a low density, low cost, and are easily shaped and manufactured into high volume molded parts. Carbon fillers trap or deflect MW radiation in enclosure walls protecting the electronic sensors inside the cavity. Conventional polymer-based radar absorbing materials are in a form of elastomer-based flexible sheets or blankets, liquid paints, and closed-cell polymer foams. Currently available materials are not suitable as MW radiation shielding in automotive applications, however.

These and other shortcomings are addressed by aspects of the present disclosure.

SUMMARY

Aspects of the disclosure relate to a thermoplastic composition including: (a) from about 82 wt % to about 92 wt % of a thermoplastic resin including poly(phenylene ether) and polystyrene; and (b) from about 3 wt % to about 13 wt % of a carbon-based filler. The carbon-based filler has a specific surface area of at least 650 square meters per gram ($m^2/g$) as tested in accordance with ASTM D3037 and an Oil Absorption Number of at least 250 milliliter per 100 gram (ml/100 g) as tested in accordance with ASTM D2414. The composition has a dielectric constant $\varepsilon'$ of between 3.5 and 10 and a dissipation loss $\varepsilon''$ of between 0.25 and 5, as measured at a frequency of between about 75 gigahertz (GHz) and about 110 GHz. A ⅛-inch-thick molded sample of the composition exhibits a Percent Absorbed Power measured in Transmission mode of at least 50% when observed according to a Free Space method at frequencies from about 75 GHz to about 110 GHz.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present document.

FIG. 6 shows the Percent Power in Transmission Mode for comparative composition C1.1 as a function of frequency when observed in the W-band (75-110 GHz).

FIG. 7 shows the Percent Power in Transmission Mode for example composition Ex1.1 as a function of frequency when observed in the W-band (75-110 GHz).

DETAILED DESCRIPTION

Figure 1A:
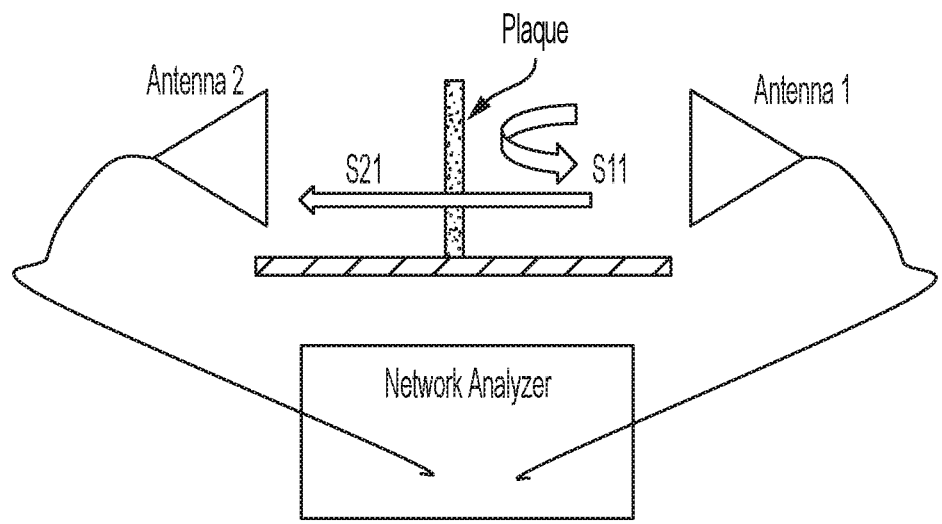
FIGS. 1A and 1B provides visual depictions of apparatus for determining the dielectric properties of the compositions of this invention in Transmission Mode and Metal-backed Reflection Mode, respectively.

This present disclosure relates to plastic composite materials that can be used to manufacture enclosures or internal components that can isolate electronic radar sensors from damaging microwave electromagnetic energy. Compared with conventional polyester-based compositions including carbon black the materials of the present disclosure are suitable for applications requiring an amorphous polymeric matrix operating at moderate to high temperatures.

The present disclosure can be understood more readily by reference to the following detailed description of the disclosure and the Examples included therein. In various aspects, the present disclosure pertains to thermoplastic compositions including: (a) from about 82 wt % to about 92 wt % of a thermoplastic resin including poly(phenylene ether) and polystyrene; and (b) from about 3 wt % to about 13 wt % of a carbon-based filler. In certain aspects the thermoplastic composition includes from about 4 wt % to about 13 wt % of the carbon-based filler, or from about 5 wt % to about 13 wt % of the carbon-based filler. The carbon-based filler has a specific surface area of at least 650 square meters per gram ($m^2/g$) as tested in accordance with ASTM D3037 and an Oil Absorption Number of at least 250 milliliter per 100 gram (ml/100 g) as tested in accordance with ASTM D2414. The composition has a dielectric constant $\varepsilon'$ of between 3.5 and 10 and a dissipation loss $\varepsilon''$ of between 0.25 and 5, as measured at a frequency of between about 75 gigahertz (GHz) and about 110 GHz. A ⅛-inch-thick molded sample of the composition exhibits a Percent Absorbed Power measured in Transmission mode of at least 50% when observed according to a Free Space method at frequencies from about 75 GHz to about 110 GHz.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a poly(phenylene ether)" includes mixtures of two or more poly(phenylene ether) polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

As used herein, the terms "number average molecular weight" or "$M_n$" can be used interchangeably, and refer to the statistical average molecular weight of all the polymer chains in the sample and is defined by the formula:

$$M_n = \frac{\sum N_i M_i}{\sum N_i},$$

where $M_i$ is the molecular weight of a chain and $N_i$ is the number of chains of that molecular weight. $M_n$ can be determined for polymers, e.g., polycarbonate polymers, by methods well known to a person having ordinary skill in the art using molecular weight standards, e.g. polycarbonate standards or polystyrene standards, preferably certified or traceable molecular weight standards.

As used herein, the terms "weight average molecular weight" or "$M_w$" can be used interchangeably, and are defined by the formula:

$$M_w = \frac{\sum N_i M_i^2}{\sum N_i M_i},$$

where $M_i$ is the molecular weight of a chain and $N_i$ is the number of chains of that molecular weight. Compared to $M_n$, $M_w$ takes into account the molecular weight of a given chain in determining contributions to the molecular weight average. Thus, the greater the molecular weight of a given chain, the more the chain contributes to the $M_w$. $M_w$ can be determined for polymers, e.g., polycarbonate polymers, by methods well known to a person having ordinary skill in the art using molecular weight standards, e.g., polycarbonate standards or polystyrene standards, preferably certified or traceable molecular weight standards.

As used herein, the terms "polydispersity index" or "PDI" can be used interchangeably, and are defined by the formula:

$$PDI = \frac{M_w}{M_n}.$$

The PDI has a value equal to or greater than 1, but as the polymer chains approach uniform chain length, the PDI approaches unity.

The terms "residues" and "structural units", used in reference to the constituents of the polymers, are synonymous throughout the specification.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

Thermoplastic Compositions

Microwave radiation (~1-300 gigahertz (GHz) frequency, or ~1-300 millimeter (mm) wavelength) is the most common source of EM energy used in the operation of radar sensors for automotive applications. Metals (aluminum, stainless steel, etc.), polymer composite materials containing metallic fillers, such as aluminum flakes, stainless steel fibers and silver-coated polyamide fibers, metalized coatings, inherently conductive polymers (polyacetylene, polypyrrole, polythiophene, polyaniline, etc.), silicon carbide, ferrites ($Fe_2O_3$+Ni/Zn/Cd/Co oxide), and carbonyl iron are some of the materials that are being used to shield automotive radar sensors from damaging microwave electromagnetic radiation.

There are several magneto-dielectric properties that radar designers consider when selecting materials for microwave radar interference. Complex dielectric permittivity (real and imaginary parts), Complex magnetic permeability (real and imaginary parts), amount of radiation Absorbed, Reflected or Transmitted by the material, Shielding Effectiveness, Reflection Loss, Insertion Loss and Attenuation are only some of the material properties of interest for the manufacture of plastic components for radar sensor applications. Frequency of the incoming radiation and material thickness are also important when trapping microwave energy that if not eliminated or minimized can interfere with the normal operation of the automotive electronic sensors.

Shielding Effectiveness (SE) of a material, for example, describes the ability of the material to reduce the electromagnetic radiation around it by blocking the field with barriers or shields made of conductive and/or magnetic materials. In these cases, the shielding can be affected by either absorbing or reflecting part or all of the electromagnetic radiation impinging on the material to be protected. The ability of the shielding material to block this harmful radiation usually depends on the frequency (or wavelength) of the incoming radiation, thickness of the protective layer, and it is expected to vary with the electrical conductivity and/or dielectric properties of the material.

The Shielding Effectiveness of a material is, in general, the result of its reflection, absorption, and internal reflection losses. It is represented by the following equation:

$$SE_T(dB) = SE_A + SE_R + SE_M$$

For shielding efficiencies >10 decibels (dB), the Shielding Effectiveness due to multiple reflections $SE_M$ is usually negligible. Therefore, the Total Shielding Effectiveness is reduced to:

$$SE_T(dB) = SE_A + SE_R, \text{ where}$$

$SE_A$ and $SE_R$ are calculated directly from S-parameters measurements using a vector network analyzer as follows:

$$SE_R = -10\log(1 - |S_{11}|^2) \text{ and } SE_A = -10\log\left(\frac{|S_{21}|^2}{1 - |S_{11}|^2}\right)$$

In the above equations, $S_{11}$ is the Scattering Parameter for Reflection, and $S_{21}$ is the Scattering Parameter for Transmission, and they are both complex numbers with real and imaginary parts. Similar formulas can be used to calculate other dielectric properties, such as Attenuation, Reflection and Insertion Loss, Power Absorbed, and many others.

Figure 1B:
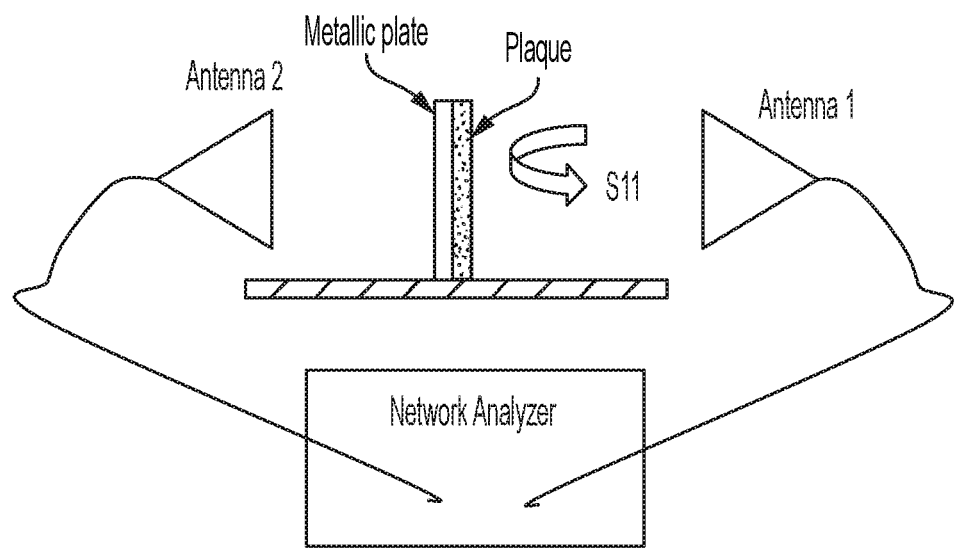

The Free Space Method used to measure the dielectric properties of the compositions of this disclosure consists of a vector network analyzer, two antennae facing each other with a sample holder placed equidistant between them. A software is used to convert the Scattering parameter output of the network analyzer to dielectric properties. Free-space measurement techniques provide a method for determining the permittivity and permeability of a material under test. These methods are contactless, that is the material under test does not make direct contact with any active component of the measurement setup. A visual depiction of an apparatus for determining the dielectric properties of the materials of this disclosure using the Free Space Method, of un-backed and metal-backed samples is shown in FIGS. 1A and 1B, respectively. For commercial applications the apparatus of FIG. 1A in Transmission Mode (non-backed) is generally used, while for military/stealth applications the metal-backed apparatus of FIG. 1B is generally preferred. Injection molded plaques of 6 in×8 in×⅛ in dimensions were the specimens tested using the Free Space Method.

Carbon (powder, platelets, fibers, nanotubes, etc.) is emerging as a filler of choice to impart electromagnetic interference properties to polymers, which when unfilled are virtually transparent to microwave radiation. When used in under-the-hood automotive enclosures, for example, polymer-carbon composites can protect the radar sensors located inside the enclosure by preventing the electromagnetic radiation from an outside source to deteriorate the sensor's electronic performance. Also, carbon-containing elastomers such as silicone, polyurethane and nitrile rubber, among several others, can be used as high-loss protective blankets to attenuate the resonant frequencies generated by the normal operation of the sensors inside the cavity.

This present disclosure describes thermoplastic-based carbon-filled materials that are rigid and of high modulus that maintain a certain shape when molded, and that can be used as internal or external components to trap electromagnetic radiation in automotive sensor applications. As described in the examples of the present disclosure, incorporating a high surface area, low pour density carbon black (e.g., ENSACO® 360 G, 780 m²/gr, 135 Kg/m³) into a thermoplastic resin including poly(phenylene ether) and polystyrene results in materials of increased real and imaginary parts of complex dielectric permittivity, and also in increased Attenuation and Shielding Effectiveness.

The ability of a carbon black to achieve electrical conductivity and dielectric interference performance is primarily a function of:

Carbon black morphology (primary particle size and aggregate structure)—The higher the structure of the carbon black, the lower the electrical conductivity percolation threshold;

Level of carbon black loading—The higher the loading of carbon black, the higher the electrical conductivity, real and imaginary parts of dielectric permittivity, percent Reflection in Transmission mode, etc.;

Dispersion quality—The compounding process will affect filler's dispersibility, resistance to shear, mixing cycle, extrusion throughput, etc.); and Polymer matrix (level of crystallinity, molecular weight)—The higher the melt flow index of the starting polymer, the lower the percolation threshold.

In particular aspects the carbon-based filler has a specific surface area of at least 650 square meters per gram (m²/g) as tested in accordance with ASTM D3037, and an Oil Absorption Number of at least 250 milliliter per 100 gram (ml/100 g) as tested in accordance with ASTM D2414. In a specific aspect the carbon black powder is ENSACO® 360 G manufactured by IMERYS Graphite & Carbon. A comparison of ENSACO® 360 G to a conventional/comparative carbon black powder, Vulcan® XC72, is provided in Table 1:

TABLE 1

Comparison of Carbon Black Powders

| Property | ENSACO® 360G | Vulcan XC72 | Comments |
| --- | --- | --- | --- |
| Specific surface area (m²/g) | 780 | 254 | BET nitrogen surface area-ASTM D3037 |
| OAN Absorption (ml/100 g) | 320 | 174 | Oil absorption number-ASTM D2414 |
| Pour denisty (Kg/m³) | 135 | 264 | ASTM D1513 |
| Ash content (%) | 0.03 | | ASTM D1506 |
| Sulfur content (%) | 0.02 | 0.3 | ASTM D1619 |
| Volatiles (%) | <0.30 | | Weight loss during heating between 105 and 950° C.; Internal Method 02 |
| Particle size (micron) | 45 | | 10 ppm sieve residue; ASTM D1514 |
| pH | 8.0-11 | | ASTM D1512 |
| Oxygen/carbon atomic ratio | | 0.057 | XPS |
| Iodine number (mg/g) | | 253 | ASTM D1510 |
| Pore diameter (nm) | 2 | | |
| Pore volume (cm³/g) | 0.06-0.43 | | |
| Carbon atomic % | 99.7 | | |
| Oxygen atomic % | Not detected | | |
| Sulfur atomic % | 0.3 | | |

As shown, the Specific Surface Area (m²/g), Oil Absorption Number (ml/100 g) and pour density (Kg/m³) of ENSACO® 360 G are 780, 320 and 135, respectively. The same parameters for the comparative Vulcan® XC72 carbon black powder are 254, 174 and 264, respectively.

Aspects of the disclosure thus generally relate to components of an automotive radar sensor (plate, enclosure, cover, etc.), which is molded from a material including a polymer and a carbon filler, with the molded part having suitable design characteristics and desirable average thickness, microwave absorption efficiency, absorption bandwidth, SE, Attenuation, electrical surface resistivity and volume resistivity properties. Further aspects relate to an article (radar sensor, camera, ECU, etc.) including a molded part made from a radar shielding material, with such molded part having at least two openings to allow the transmission of microwave radiation between a transmitting antenna and a receiving antenna located in the printed circuit board of the sensor.

In specific aspects the thermoplastic composition includes: (a) from about 82 wt % to about 92 wt % of a thermoplastic resin including poly(phenylene ether) and polystyrene; and (b) from about 3 wt % to about 13 wt % of a carbon-based filler. The carbon-based filler has a specific surface area of at least 650 square meters per gram ($m^2/g$) as tested in accordance with ASTM D3037 and an Oil Absorption Number of at least 250 milliliter per 100 gram (ml/100 g) as tested in accordance with ASTM D2414. The composition has a dielectric constant ε' of between 3.5 and 10 and a dissipation loss ε" of between 0.25 and 5, as measured at a frequency of between about 75 gigahertz (GHz) and about 110 GHz, and a ⅛-inch-thick molded sample of the composition exhibits a Percent Absorbed Power measured in Transmission mode of at least 50% when observed according to a Free Space method at frequencies from about 75 GHz to about 110 GHz. The combined weight percent value of all components does not exceed 100 wt %, and all weight percent values are based on the total weight of the composition.

In particular aspects the carbon-based filler has a specific surface area of from 650 $m^2/g$ to 1500 $m^2/g$. In further aspects the carbon-based filler has an Oil Absorption Number of from 250 ml/100 g to 500 ml/100 g.

The composition includes a poly(phenylene ether). The poly(phenylene ether) offers stiffness at elevated temperature, dimensional stability, and a combination of high impact strength and ductility properties. Suitable poly(phenylene ether)s include those including repeating structural units having the formula

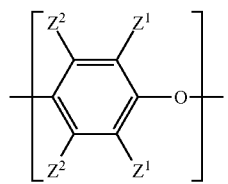

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_1$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can have an intrinsic viscosity of 0.35 to 0.6 deciliter per gram measured at 25° C. in chloroform. Within this range, the poly(phenylene ether) intrinsic viscosity can be 0.35 to 0.5 deciliter per gram, more specifically 0.4 to 0.5 deciliter per gram.

The poly(phenylene ether) has a weight average molecular weight of at least 70,000 atomic mass units after being compounded with the other components of the composition. In some aspects, the poly(phenylene ether) after being compounded with the other components has a weight average molecular weight of 70,000 to 110,000 atomic mass units, specifically 70,000 to 100,000 atomic mass units, more specifically 70,000 to 90,000 atomic mass units. Weight average molecular weight can be determined by gel permeation chromatography and based on comparison to polystyrene standards.

In some aspects, the poly(phenylene ether) before being compounded with the other components, has a weight average molecular weight of 60,000 to 90,000 atomic mass units, specifically 60,000 to 80,000 atomic mass units, more specifically 60,000 to 70,000 atomic mass units. These pre-compounding molecular weights can provide the desired post-compounding molecular weights described above.

In some aspects, the poly(phenylene ether) is essentially free of incorporated diphenoquinone residues. In the context, "essentially free" means that the less than 1 weight percent of poly(phenylene ether) molecules include the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) structure) by heating the polymerization reaction mixture to yield a poly(phenylene ether) including terminal or internal diphenoquinone residues. For example, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly (phenylene ether) with terminal and internal residues of incorporated diphenoquinone. However, such reequilibration reduces the molecular weight of the poly(phenylene ether). Accordingly, when a higher molecular weight poly (phenylene ether) is desired, it may be desirable to separate the diphenoquinone from the poly(phenylene ether) rather than reequilibrating the diphenoquinone into the poly(phenylene ether) chains. Such a separation can be achieved, for example, by precipitation of the poly(phenylene ether) in a solvent or solvent mixture in which the poly(phenylene ether) is insoluble and the diphenoquinone is soluble. For example, when a poly(phenylene ether) is prepared by oxidative polymerization of 2,6-dimethylphenol in toluene to yield a toluene solution including poly(2,6-dimethyl-1,4-phenylene ether) and 3,3',5,5'-tetramethyldiphenoquinone, a poly(2,6-dimethyl-1,4-phenylene ether) essentially free of diphenoquinone can be obtained by mixing 1 volume of the toluene solution with 1 to 4 volumes of methanol or a methanol/water mixture. Alternatively, the amount of diphenoquinone side-product generated during oxidative polymerization can be minimized (e.g., by initiating oxidative polymerization in the presence of less than 10 weight percent of the monohydric phenol and adding at least 95 weight percent of the monohydric phenol over the course of at least 50 minutes), and/or the reequilibration of the diphenoquinone into the poly(phenylene ether) chain can be minimized (e.g., by isolating the poly(phenylene ether) no more than 200 minutes after termination of oxidative polymerization). These approaches are described in U.S. Pat. No. 8,025,158 of Delsman et al. In an alternative approach utilizing the temperature-dependent solubility of diphenoquinone in toluene, a toluene solution containing diphenoquinone and poly(phenylene ether) can be adjusted to a temperature of 25° C., at which diphenoquinone is poorly soluble but the poly(phenylene ether) is soluble, and the insoluble diphenoquinone can be removed by solid-liquid separation (e.g., filtration).

The poly(phenylene ether) can include 2,6-dimethyl-1,4-phenylene ether units, 2,3,6-trimethyl-1,4-phenylene ether units, or a combination thereof. The poly(phenylene ether) can be a poly(2,6-dimethyl-1,4-phenylene ether). In some aspects, the poly(phenylene ether) includes a poly(2,6-dimethyl-1,4-phenylene ether) having an intrinsic viscosity of 0.35 to 0.6 deciliter per gram measured at 25° C. in chloroform. Within this range, the poly(2,6 dimethyl-1,4-phenylene ether) intrinsic viscosity can be 0.35 to 0.5 deciliter per gram, more specifically 0.4 to 0.5 deciliter per gram, as measured at 25° C. in chloroform.

In some aspects, the poly(phenylene ether) includes molecules having aminoalkyl-containing end group(s), typically located in a position ortho to the hydroxy group. The aminoalkyl-containing end group can be, for example, a di-n-butylaminomethyl group or a morpholinomethyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations including at least one of the foregoing.

In particular aspects the poly(phenylene ether) includes polyphenylene oxide (PPO). An example poly(phenylene ether) is poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from SABIC.

In some aspects the thermoplastic composition includes the poly(phenylene ether) as a predominant component in the composition, such as at least 40 wt %, or at least 45 wt %, or at least 50 wt %, or at least 55 wt %, at least 60 wt %, at least 65 wt %, or from 50-75 wt %, or from 55-75 wt %, or from 60-75 wt %, or from 65-75 wt %, or from 65-72 wt %.

The thermoplastic compositions also include polystyrene (PS). PS may be added to reduce the viscosity of the thermoplastic composition and make it processable at extrusion temperatures. Polystyrene is a hydrogenated block copolymer of an alkenyl aromatic compound and a conjugated diene. For brevity, this component is referred to as the "hydrogenated block copolymer". The hydrogenated block copolymer generally includes 10 to 45 weight percent poly (alkenyl aromatic) content, based on the weight of the hydrogenated block copolymer. Within this range, the poly (alkenyl aromatic) content can be 20 to 40 weight percent, specifically 25 to 35 weight percent.

In some aspects the hydrogenated block copolymer has a weight average molecular weight of at least 100,000 atomic mass units. In some aspects the hydrogenated block copolymer includes a polystyrene-poly(ethylene-butylene)-polystyrene triblock copolymer having a weight average molecular weight of 100,000 to 1,000,000 atomic mass units, specifically 100,000 to 400,000 atomic mass units.

The alkenyl aromatic monomer used to prepare the hydrogenated block copolymer can have the structure

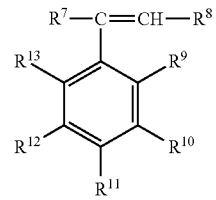

wherein $R^7$ and $R^8$ each independently represent a hydrogen atom, a $C_1$-$C_8$ alkyl group, or a $C_2$-$C_8$ alkenyl group; $R^9$ and $R^{13}$ each independently represent a hydrogen atom, a $C_1$-$C_8$ alkyl group, a chlorine atom, or a bromine atom; and $R^{10}$, and $R^{12}$ each independently represent a hydrogen atom, a $C_1$-$C_8$ alkyl group, or a $C_2$-$C_8$ alkenyl group, or $R^{10}$ and $R^{11}$ are taken together with the central aromatic ring to form a naphthyl group, or $R^{11}$ and $R^{12}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some aspects, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some aspects, the conjugated diene is 1,3-butadiene, 2-methyl-1,3-butadiene, or a combination thereof. In some aspects, the conjugated diene consists of 1,3-butadiene.

The hydrogenated block copolymer is a copolymer including (A) at least one block derived from an alkenyl aromatic compound and (B) at least one block derived from a conjugated diene, in which the aliphatic unsaturated group content in the block (B) is at least partially reduced by hydrogenation. In some aspects, the aliphatic unsaturation in the (B) block is reduced by at least 50 percent, specifically at least 70 percent. The arrangement of blocks (A) and (B) includes a linear structure, a grafted structure, and a radial teleblock structure with or without a branched chain. Linear block copolymers include tapered linear structures and non-tapered linear structures. In some aspects, the hydrogenated block copolymer has a tapered linear structure. In some aspects, the hydrogenated block copolymer has a non-tapered linear structure. In some aspects, the hydrogenated block copolymer includes a (B) block that includes random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some aspects, the hydrogenated block copolymer is a diblock copolymer, a triblock copolymer, or a combination thereof.

In some aspects, the hydrogenated block copolymer excludes the residue of monomers other than the alkenyl aromatic compound and the conjugated diene. In some aspects, the hydrogenated block copolymer consists of blocks derived from the alkenyl aromatic compound and the conjugated diene. It does not include grafts formed from these or any other monomers. It also consists of carbon and hydrogen atoms and therefore excludes heteroatoms. In some aspects, the hydrogenated block copolymer includes the residue of one or more acid functionalizing agents, such as maleic anhydride. In some aspects, the hydrogenated block copolymer includes a polystyrene-poly(ethylene-butylene)-polystyrene triblock copolymer.

Methods for preparing hydrogenated block copolymers are known in the art and many hydrogenated block copolymers are commercially available. Illustrative commercially available hydrogenated block copolymers include the polystyrene-poly (ethylene-propylene) diblock copolymers available from Kraton Polymers as KRATON G1701 (having 37 weight percent polystyrene) and G1702 (having 28 weight percent polystyrene); the polystyrene-poly(ethylene-butylene)-polystyrene triblock copolymers available from Kraton Polymers as KRATON G1641 (having 33 weight percent polystyrene), G1651 (having 31-33 weight percent polystyrene), and G1654 (having 31 weight percent polystyrene); and the polystyrene-poly(ethylene-ethylene/propylene)-polystyrene triblock copolymers available from Kuraray as SEPTON S4044, S4055, S4077, and S4099. Additional commercially available hydrogenated block copolymers include polystyrene-poly (ethylene-butylene)-polystyrene (SEBS) triblock copolymers available from Dynasol as CALPRENE CH-6170, CH-7171, CH-6174 and CH-6140, and from Kuraray as SEPTON 8006 and 8007; polystyrene-poly(ethylene-propylene)-polystyrene (SEPS) copolymers available from Kuraray as SEPTON 2006 and 2007; and oil-extended compounds of these hydrogenated block copolymers available from Kraton Polymers as KRATON G4609 and G4610 and from Asahi as TUFTEC H1272. Mixtures of two of more hydrogenated block copolymers can be used. In some aspects, the hydrogenated block copolymer includes a polystyrene poly(ethylene-butylene)-polystyrene triblock copolymer having a weight average molecular weight of at least 100,000 atomic mass units.

In some aspects the thermoplastic composition includes from about 5 wt % to about 40 wt % polystyrene, or from about 5 wt % to about 35 wt % polystyrene, or from about 5 wt % to about 30 wt % polystyrene, or from about 5 wt % to about 25 wt % polystyrene, or from about 5 wt % to about 20 wt % polystyrene, or from about 10 wt % to about 40 wt % polystyrene, or from about 10 wt % to about 35 wt % polystyrene, or from about 10 wt % to about 30 wt % polystyrene, or from about 10 wt % to about 25 wt % polystyrene, or from about 10 wt % to about 20 wt % polystyrene, or from about 15 wt % to about 40 wt % polystyrene, or from about 15 wt % to about 35 wt % polystyrene, or from about 15 wt % to about 30 wt % polystyrene, or from about 15 wt % to about 25 wt % polystyrene, or from about 15 wt % to about 20 wt % polystyrene, or from about 17 wt % to about 20 wt % polystyrene.

The composition includes from about 1 wt % to about 10 wt % of an impact modifier component. An impact modifier is a rubbery polymer that is compatible with the thermoplastic resin including poly(phenylene ether) and polystyrene and improves the impact resistance of the composition as measured by notched Izod impact strength measured according to ASTM D256 at 23° C. The impact modifier includes poly(alkenyl aromatic) content and rubber content, and the weight ratio of poly(alkenyl aromatic) content to rubber content is at least 0.5. In some aspects, the weight ratio of poly(alkenyl aromatic) content to rubber content is 0.5 to 20, specifically 1 to 10, more specifically 2 to 5. As an example, when the impact modifier is rubber-modified polystyrene, the poly(alkenyl aromatic) content consists of polystyrene and the rubber content consists of polybutadiene. As another example, when the impact modifier is a polystyrene-poly(ethylene-butylene)-polystyrene triblock copolymer, the poly(alkenyl aromatic) content consists of polystyrene and the rubber content consists of poly(ethylene-butylene). Suitable impact modifiers include rubber-modified poly(alkenyl aromatic)s (such as rubber-modified polystyrenes, also known as high-impact polystyrenes), unhydrogenated block copolymers of an alkenyl aromatic monomer and a conjugated diene (such as polystyrene-polybutadiene diblock copolymers, polystyrene-polybutadiene-polystyrene triblock copolymers, polystyrene-polyisoprene diblock copolymers, and polystyrene-polyisoprene-polystyrene triblock copolymers), hydrogenated block copolymers of an alkenyl aromatic monomer and a conjugated diene (such as polystyrene-poly(ethylene-butylene) diblock copolymer, polystyrene-poly(ethylene-butylene)-polystyrene triblock copolymers, polystyrene-poly(ethylene-propylene) diblock copolymers, and polystyrene-poly (ethylene-propylene)-polystyrene triblock copolymers), and combinations thereof. Thus, sources of rubber content can include polybutadienes, polybutadiene blocks within block copolymers, polybutadiene grafts within graft copolymers, polyisoprenes, polyisoprene blocks within block copolymers, polyisoprene grafts within graft copolymers, ethylene-propylene copolymer blocks within block copolymers, and ethylene-butylene blocks within block copolymers.

The alkenyl aromatic monomer used to prepare the impact modifier can have the structure

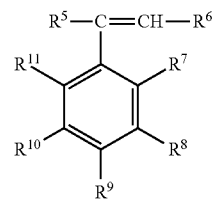

wherein $R^5$ and $R^6$ each independently represent a hydrogen atom, a $C_1$-$C_8$ alkyl group, or a $C_2$-$C_8$ alkenyl group; $R^7$ and $R^{11}$ each independently represent a hydrogen atom, a $C_1$-$C_8$ alkyl group, a chlorine atom, or a bromine atom; and $R^8$, $R^9$, and $R^{10}$ each independently represent a hydrogen atom, a $C_1$-$C_8$ alkyl group, or a $C_2$-$C_8$ alkenyl group, or $R^8$ and $R^9$ are taken together with the central aromatic ring to form a naphthyl group, or $R^9$ and $R^{10}$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some aspects, the alkenyl aromatic monomer is styrene.

The conjugated diene used to prepare the unhydrogenated or hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some aspects, the conjugated diene is 1,3-butadiene, 2-methyl-1,3-butadiene, or a combination thereof. In some aspects, the conjugated diene consists of 1,3-butadiene.

In some aspects, the impact modifier includes a rubber-modified polystyrene. The rubber-modified polystyrene includes polystyrene and polybutadiene. Rubber-modified polystyrenes are sometimes referred to as "high-impact polystyrenes" or "HIPS". In some aspects, the rubber-modified polystyrene includes 80 to 96 weight percent polystyrene, specifically 88 to 94 weight percent polystyrene; and 4 to 20 weight percent polybutadiene, specifically 6 to 12 weight percent polybutadiene, based on the weight of the rubber-modified polystyrene. In some aspects, the rubber-modified polystyrene has an effective gel content of 10 to 35 percent. Suitable rubber-modified polystyrenes are commercially available as, for example, HIPS3190 from SABIC.

In some aspects, the impact modifier includes a hydrogenated block copolymer of an alkenyl aromatic monomer and a conjugated diene. For brevity, this component is referred to as the "hydrogenated block copolymer". The hydrogenated block copolymer can include about 10 to about 90 weight percent of poly(alkenyl aromatic) content and about 90 to about 10 weight percent of hydrogenated poly(conjugated diene) content, based on the weight of the hydrogenated block copolymer. In some aspects, the hydrogenated block copolymer is a low poly(alkenyl aromatic content) hydrogenated block copolymer in which the poly(alkenyl aromatic) content is about 10 to less than 40 weight percent, specifically about 20 to about 35 weight percent, more specifically about 25 to about 35 weight percent, yet more specifically about 30 to about 35 weight percent, all based on the weight of the low poly(alkenyl aromatic content) hydrogenated block copolymer. In other aspects, the hydrogenated block copolymer is a high poly(alkenyl aromatic content) hydrogenated block copolymer in which the poly(alkenyl aromatic) content is 40 to about 90 weight percent, specifically about 50 to about 80 weight percent, more specifically about 60 to about 70 weight percent, all based on the weight of the high poly(alkenyl aromatic content) hydrogenated block copolymer.

In further aspects the composition further includes from 0.01 wt % to about 5 wt % of a polyethylene polymer. The polyethylene polymer may include, but is not limited to low-density polyethylene, linear low-density polyethylene (LLDPE), high-density polyethylene, and combinations thereof.

In some aspects the composition further includes at least one additional carbon-based filler different from the carbon-based filler of element (b). An exemplary carbon-based filler includes, but is not limited to, Vulcan® XC72 available from Cabot.

Properties of Thermoplastic Compositions

Thermoplastic compositions according to aspects of the disclosure have improved dielectric properties as compared to conventional compositions. In some aspects a ⅛-inch-thick molded sample of the composition exhibits a Percent Absorbed Power measured in Transmission mode of at least 60% when observed according to a Free Space method at frequencies from about 75 GHz to about 110 GHz. In particular aspects the carbon-based filler is present in an amount of from 4 wt % to 8 wt % and the molded sample of the composition has a Percent Absorbed Power measured in Transmission mode of at least 80% at a frequency of 77 GHz.

In further aspects the composition has an Attenuation Constant of between about −5 decibels per centimeter (dB/cm) and −110 dB/cm. In some aspects the composition has a Total Shielding Effectiveness of between about 5 dB and about 50 dB at a frequency of from about 75 GHz to about 110 GHz or in particular aspects between about 5 dB and about 45 dB, or between about 5 dB and about 40 dB, or between about 5 dB and about 35 dB.

In certain aspects the composition has a microwave Absorbed Power measured in Transmission mode between about 40% to about 90% of incoming radiation at a frequency of from about 75 GHz to about 110 GHz, or in some aspects between about 45% to about 90% of incoming radiation, between about 50% to about 90% of incoming radiation, between about 55% to about 90% of incoming radiation, between about 60% to about 90% of incoming radiation.

In particular aspects the composition has a volume electrical resistivity of less than 2.55E+14 Ohm.cm, or less than 1.0E+14 Ohm.cm, or less than 1.0E+13 Ohm.cm, or less than 1.0E+12 Ohm.cm, or less than 1.0E+11 Ohm.cm, or less than 1.0E+10 Ohm.cm, or less than 1.0E+09 Ohm.cm, or less than 1.0E+08 Ohm.cm, or less than 1.0E+07 Ohm.cm, or less than 1.0E+06 Ohm.com, or less than 1.0E+05 Ohm.cm, or less than 1.0E+04 Ohm.cm, or less than 1.0E+03 Ohm.cm, as determined in accordance with the SABIC Method.

Methods of Manufacture

The one or any foregoing components described herein may be first dry blended with each other, or dry blended with any combination of foregoing components, then fed into an extruder from one or multi-feeders, or separately fed into an extruder from one or multi-feeders. The fillers used in the disclosure may also be first processed into a masterbatch, then fed into an extruder. The components may be fed into the extruder from a throat hopper or any side feeders.

The extruders used in the disclosure may have a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, co-kneaders, disc-pack processors, various other types of extrusion equipment, or combinations including at least one of the foregoing.

The components may also be mixed together and then melt-blended to form the thermoplastic compositions. The melt blending of the components involves the use of shear force, extensional force, compressive force, ultrasonic energy, electromagnetic energy, thermal energy or combinations including at least one of the foregoing forces or forms of energy.

The barrel temperature on the extruder during compounding can be set at the temperature where at least a portion of the polymer has reached a temperature greater than or equal to about the melting temperature, if the resin is a semicrystalline organic polymer, or the flow point (e.g., the glass transition temperature) if the resin is an amorphous resin.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

The temperature of the melt in the present process may in some aspects be maintained as low as possible in order to avoid excessive thermal degradation of the components. In certain aspects the melt temperature is maintained between about 230° C. and about 350° C., although higher temperatures can be used provided that the residence time of the resin in the processing equipment is kept relatively short. In some aspects the melt processed composition exits processing equipment such as an extruder through small exit holes in a die. The resulting strands of molten resin may be cooled by passing the strands through a water bath. The cooled strands can be chopped into pellets for packaging and further handling.

Articles of Manufacture

In certain aspects, the present disclosure pertains to shaped, formed, or molded articles including the thermoplastic compositions. The thermoplastic compositions can be molded into useful shaped articles by a variety of means such as injection molding, extrusion, rotational molding, blow molding and thermoforming. Suitable articles may be used in technologies in which the trapping of microwave radiation by an absorption mechanism is desired, for example but not limited to automotive or telecommunications applications. Example of automotive applications include but are not limited to internal or external components of an automotive sensor, including a radar sensor, a camera or an electronic control unit (ECU). Example of telecommunications applications include but are not limited to mobile phones/tablets, car radios, computers, parabolic antennas, 5G telecommunications base stations, and the like.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:
(a) from about 82 wt % to about 92 wt % of a thermoplastic resin comprising poly(phenylene ether) and polystyrene; and
(b) from about 3 wt % to about 13 wt % of a carbon-based filler, wherein the carbon-based filler has a specific surface area of at least 650 square meters per gram ($m^2/g$), and an Oil Absorption Number of at least 250 milliliter per 100 gram (ml/100 g) as tested in accordance with ASTM D2414, wherein
the composition has a dielectric constant $\varepsilon'$ of between 3.5 and 10 and a dissipation loss $\varepsilon''$ of between 0.25 and 5, as measured at a frequency of between about 75 gigahertz (GHz) and about 110 GHz,
a ⅛-inch-thick molded sample of the composition exhibits a Percent Absorbed Power measured in Transmission mode of at least 50% when observed according to a Free Space method at frequencies from about 75 GHz to about 110 GHz, and
the combined weight percent value of all components does not exceed 100 wt %, and all weight percent values are based on the total weight of the composition.

Aspect 2. The composition according to Aspect 1, wherein a ⅛-inch-thick molded sample of the composition exhibits a Percent Absorbed Power measured in Transmission mode of at least 60% when observed according to a Free Space method at frequencies from about 75 GHz to about 110 GHz.

Aspect 3. The composition according to Aspect 1 or 2, wherein the carbon-based filler is present in an amount of from 4 wt % to 8 wt % and the molded sample of the composition has a Percent Absorbed Power measured in Transmission mode of at least 80% at a frequency of 77 GHz.

Aspect 4. The composition according to any of Aspects 1 to 3, wherein the carbon-based filler has a specific surface area of from 650 $m^2/g$ to 1500 $m^2/g$ as determined in accordance with ASM D3037 and an Oil Absorption Number of from 250 ml/100 g to 500 ml/100 g as determined in accordance with ASTM D2414.

Aspect 5. The composition according to any of Aspects 1 to 4, wherein the poly(phenylene ether) comprises polyphenylene oxide (PPO).

Aspect 6. The composition according to any of Aspects 1 to 5, wherein the composition further comprises from about 1 wt % to about 10 wt % of an impact modifier component.

Aspect 7. The composition according to Aspect 6, wherein the impact modifier component comprises styrene-ethylene-butylene-styrene rubber.

Aspect 8. The composition according to any of Aspects 1 to 7, wherein the composition further comprises from 0.01 wt % to about 5 wt % of a polyethylene polymer.

Aspect 9. The composition according to Aspect 8, wherein the polyethylene polymer comprises linear low-density polyethylene (LLDPE).

Aspect 10. The composition according to any of Aspects 1 to 9, wherein the composition has an Attenuation Constant of between about −5 decibels per centimeter (dB/cm) and −110 dB/cm at a frequency of from about 75 GHz to 110 GHz as determined according to the Free Space Method.

Aspect 11. The composition according to any of Aspects 1 to 10, wherein the composition has a Total Shielding Effectiveness of between about 5 dB and about 50 dB at a frequency of from about 75 GHz to 110 GHz as determined according to the Free Space Method.

Aspect 12. The composition according to any of Aspects 1 to 11, wherein the composition has a microwave Absorbed Power measured in Transmission mode between about 40% to about 90% of incoming radiation at a frequency of from about 75 GHz to 110 GHz as determined according to the Free Space Method.

Aspect 13. The composition according to any of Aspects 1 to 12, wherein the composition has a volume electrical resistivity of less than 2.55E+14 Ohm.cm as determined in accordance with the SABIC Method.

Aspect 14. The composition according to any of Aspects 1 to 13, wherein the composition further comprises at least one additional carbon-based filler different from the carbon-based filler of element (b).

Aspect 15. The composition according to any of Aspects 1 to 14, wherein the composition comprises from about 5 wt % to about 13 wt % of the carbon-based filler, and wherein the composition has a volume electrical resistivity of less than 1.0E+3 Ohm.cm as determined in accordance with the SABIC Method.

Aspect 16. An article comprising the composition according to any of Aspects 1 to 15.

Aspect 17. The article according to Aspect 16, wherein the article comprises an internal or external component of an automotive sensor.

Aspect 18. The article according to Aspect 17, wherein the internal or external component comprises a radar sensor, a camera or an electronic control unit (ECU).

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example and comparative compositions including the components listed in Table 2 were prepared:

TABLE 2

| Components Used | |
|---|---|
| Component | Description |
| PPO | Poly(2,6-dimethyl-1,4-phenylene ether), CAS Reg. No. 25134-01-4, having an intrinsic viscosity of 0.46 deciliter per gram measured in chloroform at 25° C.; obtained as PPO 646 from SABIC |
| Polystyrene | CAS Reg. No. 9003-53-6 |
| SEBS (Impact modifier) | Polystyrene-poly(ethylene-butylene)-polystyrene triblock copolymer, CAS Reg. No. 66070-58-4, G1651 from Kraton |
| LLDPE | Polyethylene, CAS Reg. No. 25087-34-7, having a density of 0.925 grams per cubic centimeter and a MVR of 20 cubic centimeters per 10 minutes at 190° C./2.16 kilograms. |
| Carbon Powder | ENSACO ® 360G carbon powder (Imerys) |

The composition of the example and comparative compositions are shown in Table 3:

TABLE 3

| Comparative and Example Compositions | | | | | | | |
|---|---|---|---|---|---|---|---|
| Composition | C 1.1 | Ex 1.1 | Ex 1.2 | Ex 1.3 | Ex 1.4 | Ex 1.5 | C 1.2 |
| PPO | 73.36 | 71.78 | 70.2 | 68.63 | 67.05 | 65.47 | 63.5 |
| Polystyrene | 19.64 | 19.22 | 18.8 | 18.37 | 17.95 | 17.53 | 17 |
| SEBS | 4 | 4 | 4 | 4 | 4 | 4 | 4 |
| LLDPE | 1 | 1 | 1 | 1 | 1 | 1 | 1 |
| ENSACO 360G Carbon Powder | 2 | 4 | 6 | 8 | 10 | 12 | 14.5 |

Table 4 lists various dielectric properties of the compositions. Comparative composition C1.2 could not be extruded and tested due to its high carbon content:

TABLE 4

| Properties of Compositions of Table 3 | | | | | | |
|---|---|---|---|---|---|---|
| Properties | C 1.1 | Ex 1.1 | Ex 1.2 | Ex 1.3 | Ex 1.4 | Ex 1.5 |
| Frequency (Hz) | 7.70E+10 | 7.70E+10 | 7.70E+10 | 7.70E+10 | 7.70E+10 | 7.70E+10 |
| $\varepsilon'$ | 3.101 | 3.926 | 5.061 | 6.199 | 7.570 | 8.553 |
| $\varepsilon''$ | 0.106 | 0.440 | 1.121 | 1.653 | 2.698 | 3.375 |
| $\varepsilon''/\varepsilon'$ (tan $\delta$) | 0.034 | 0.112 | 0.222 | 0.267 | 0.356 | 0.395 |
| Attenuation Constant (dB/cm) | −4.195 | −15.516 | −34.687 | −46.099 | −67.646 | −79.335 |
| Total Shielding Effectiveness (dB) | 1.579 | 6.122 | 12.761 | 16.866 | 24.544 | 28.704 |

TABLE 4-continued

Properties of Compositions of Table 3

| Properties | C 1.1 | Ex 1.1 | Ex 1.2 | Ex 1.3 | Ex 1.4 | Ex 1.5 |
|---|---|---|---|---|---|---|
| RL Measured (Metal-Backed) (dB) | −1.593 | −9.294 | −7.718 | −7.719 | −6.289 | −6.142 |
| RL Calculated (Metal-Backed) (dB) | −1.600 | −7.289 | −7.625 | −6.957 | −6.298 | −5.782 |
| % Power in Metal-Backed Reflection (Absorption) | 30.70 | 88.23 | 83.09 | 83.09 | 76.50 | 75.69 |
| % Power in Transmission (Reflected) | 0.96 | 13.76 | 12.14 | 18.93 | 24.09 | 26.38 |
| % Power in Transmission (Absorbed) | 29.52 | 61.82 | 82.56 | 79.01 | 75.56 | 73.49 |
| % Power in Transmission (Transmitted) | 69.52 | 24.42 | 5.30 | 2.06 | 0.35 | 0.13 |

The actual thickness of each of the 6 in×8 in×⅛ in molded samples of Table 4 was measured at 20 points, and the average thickness for the sample was determined as follows: C1.1 (3.260 mm); Ex1.1 (3.227 mm); Ex1.2 (3.289 mm); Ex1.3 (3.272 mm); Ex1.4 (3.302 mm); and Ex1.5 (3.305 mm).

Volume Electrical Resistivities properties of these compositions are shown in Table 5:

TABLE 5

Volume Electrical Resistivities

| Property | C 1.1 | Ex 1.1 | Ex 1.2 | Ex 1.3 | Ex 1.4 | Ex 1.5 |
|---|---|---|---|---|---|---|
| Electrical resistance (avg) (Ohm) | 6.40E+12 | 6.10E+12 | 13652 | 916 | 413 | 460 |
| Bar (cross section/length) | 40.79 | 40.79 | 0.0623 | 0.0623 | 0.0623 | 0.0623 |
| Electrical resistivity (Ohm.cm) | 2.61E+14 | 2.49E+14 | 851 | 57 | 26 | 29 |
| Method used | ASTM D257 | ASTM D257 | SABIC Method | SABIC Method | SABIC Method | SABIC Method |

The "SABIC Method" for determining volume electrical resistivities of the compositions includes using a molded bar of the material having a nominal length of 63 millimeter (mm), a width of 12.35 mm and a thickness of 3.18 mm. The bar thus has a cross section (width×thickness) of 39.27 mm$^2$, or 0.3927 cm$^2$. The cross section/length of the bar is 0.3927 cm$^2$/6.3 cm, or 0.0623 cm. The two ends of the bar are cryogenically fractured in liquid nitrogen to produce clean cuts, and the bar ends painted with a silver-based paint to eliminate end effects. The Resistance (in Ohms) between the two ends of the silver-painted bar is measured using an Ohm-meter, and the volume electrical resistivity (in Ohm.cm) is then calculated by multiplying the measured Resistance (in Ohms) by the ratio of the cross section of the bar divided by its length (in cm$^2$/cm, or cm). The ASTM D257 Method is used with a correction factor of 40.79.

Figure 2B:
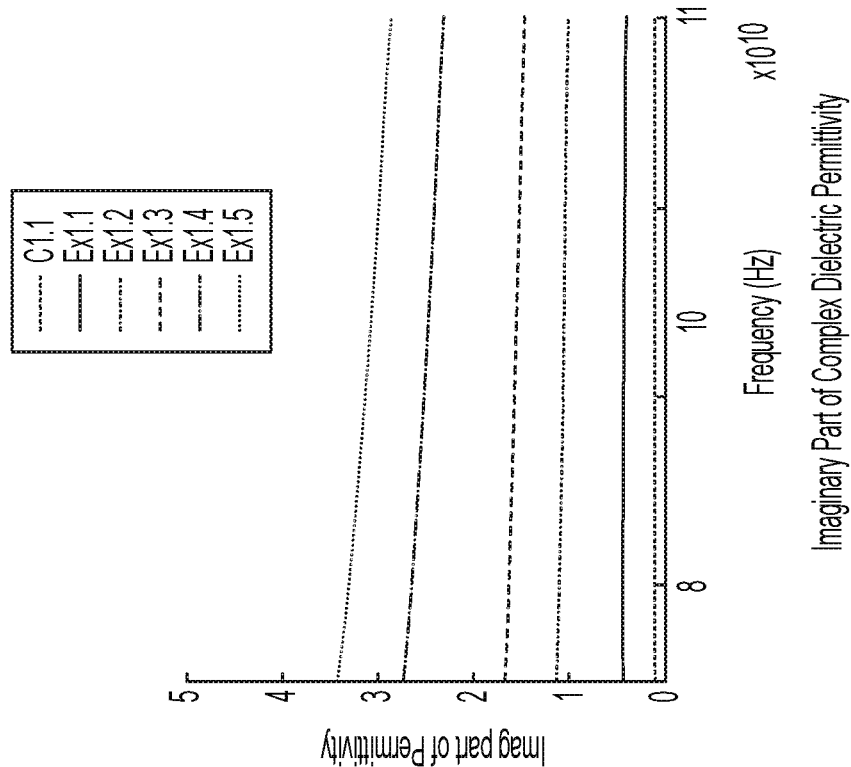
FIGS. 2A and 2B show the real and imaginary parts of the complex dielectric permittivity (real part $\varepsilon'$ also known as the Dielectric Constant, and imaginary part $\varepsilon''$ also known as the Dissipation Loss), respectively, for comparative and example compositions as a function of frequency when observed in the W-band (75-110 GHz).
Figure 2A:
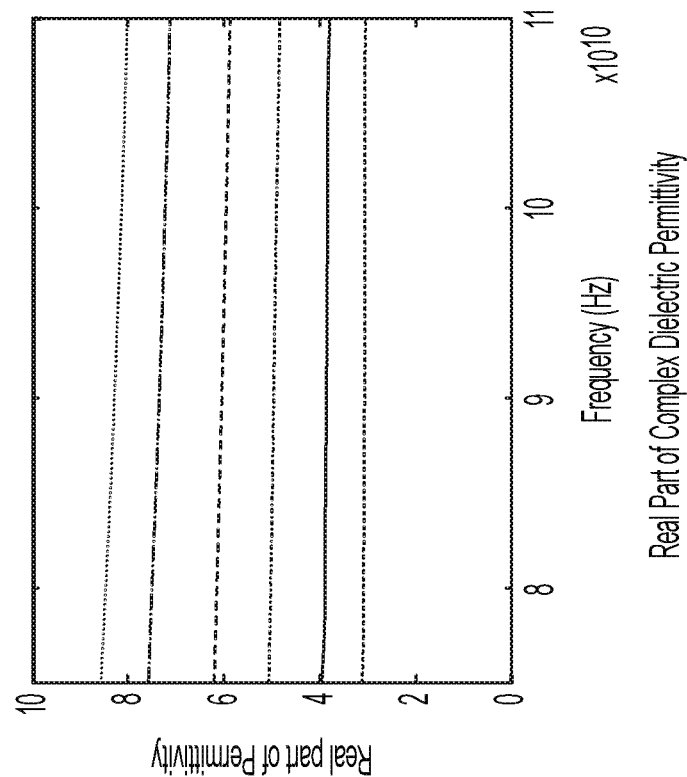

From the data it is observed that as carbon content is increased electrical resistivity is reduced (electrical conductivity is increased). Graphs showing various dielectric properties of the compositions are shown in FIGS. 2A-12. Specifically, FIGS. 2A and 2B show the real and imaginary parts of the complex dielectric permittivity (real part of dielectric permittivity ε', and imaginary part of dielectric permittivity ε", respectively) for the compositions as a function of frequency in the W-band. Frequency was measured between 75 and 110 gigahertz (GHz). As shown, ε' and ε" are higher at the tested frequencies with increasing carbon black content.

Figure 3A:
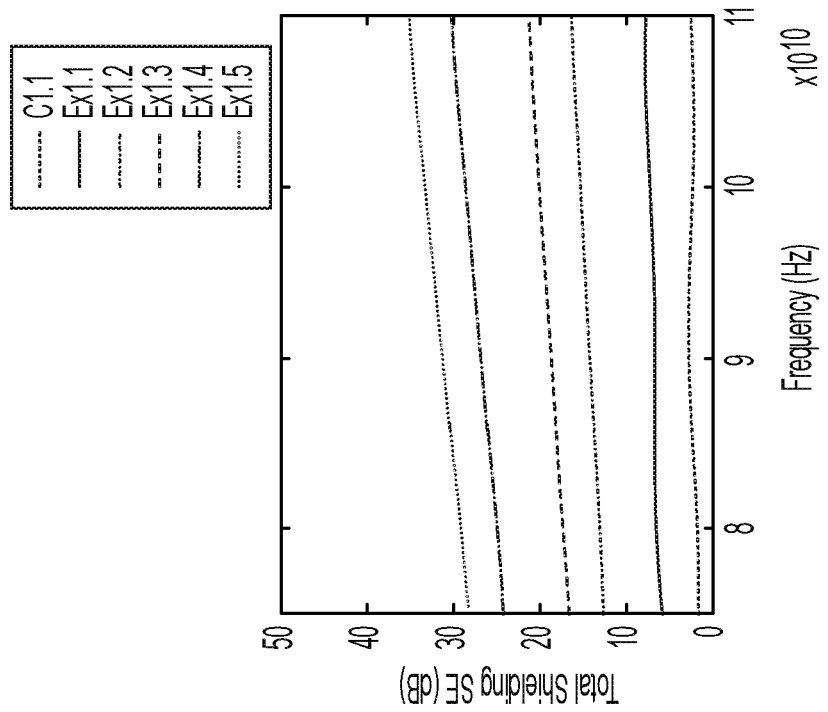
FIGS. 3A and 3B show the Attenuation Constant and Total Shielding Effectiveness, respectively, for comparative and example compositions as a function of frequency when observed in the W-band (75-110 GHz).
Figure 3B:
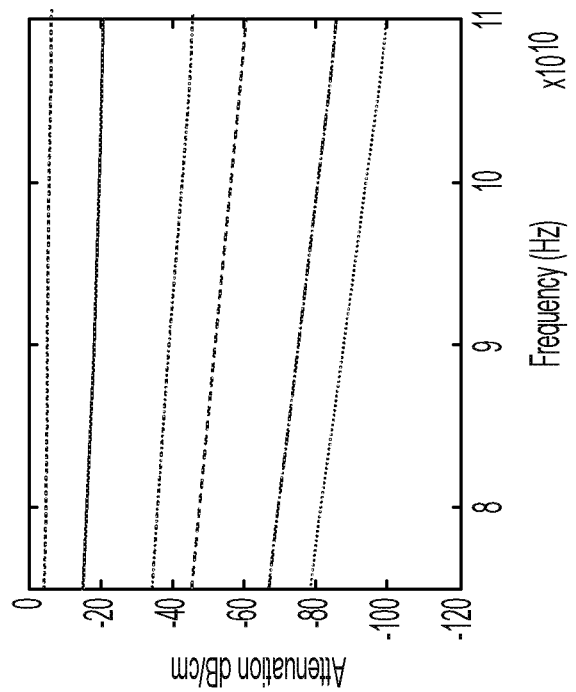

Attenuation and Total Shielding Effectiveness are shown in FIGS. 3A and 3B, respectively. As the data show, Attenuation and Total Shielding Effectiveness both increase with increasing carbon black content as more microwave energy is attenuated or shielded when the carbon level in the material increases (there are more carbon particles to trap the microwave radiation). The negative sign in the values of Attenuation denotes an energy loss, which is the amount of energy (in dB per unit thickness of the material) that has been lost due to the presence of the carbon-based material.

Figure 4:
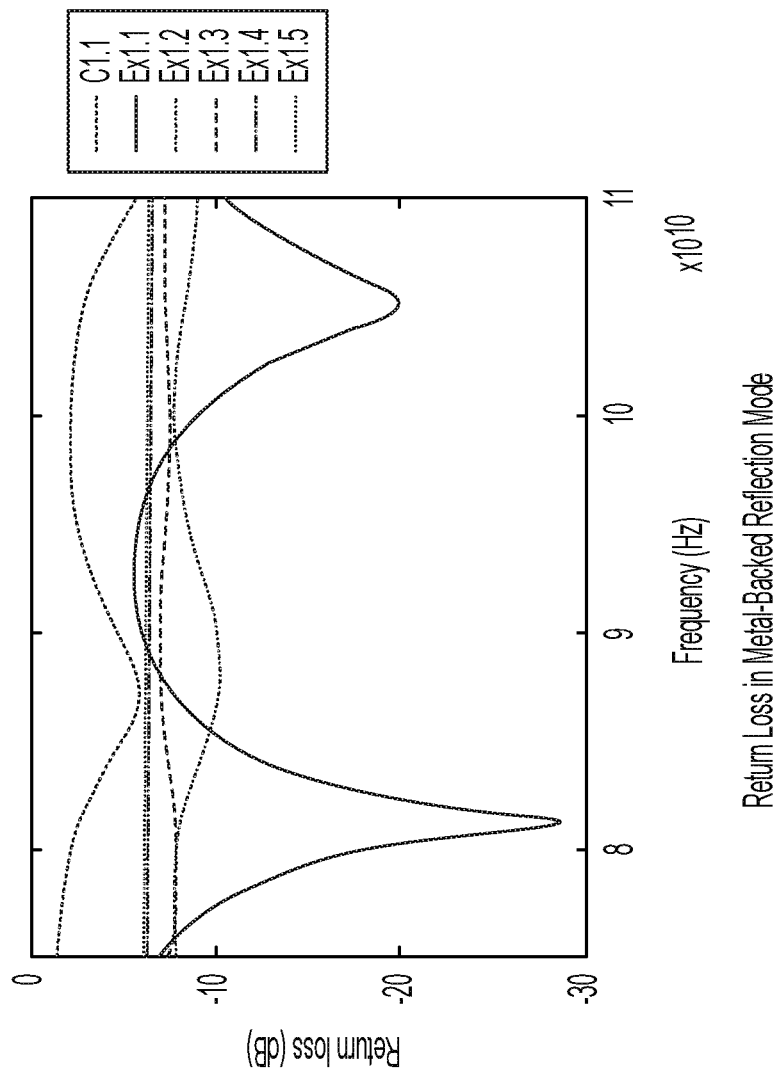
FIG. 4 shows the Return Loss measured in Metal-backed Reflection Mode for comparative and example compositions as a function of frequency when observed in the W-band (75-110 GHz).
Figure 5B:
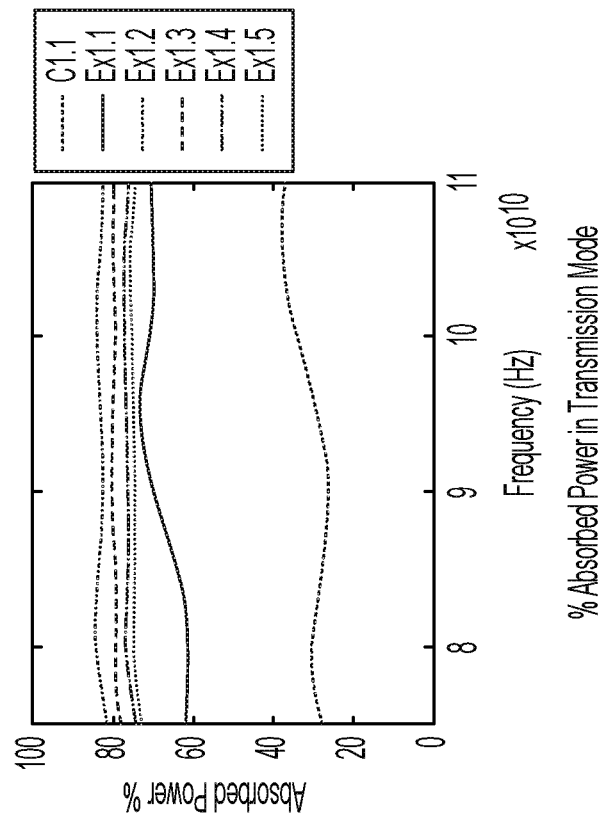
FIGS. 5A and 5B show the Percent Absorbed Power in Metal-backed Reflection Mode and in Transmission Mode, respectively, for comparative and example compositions as a function of frequency when observed in the W-band (75-110 GHz).
Figure 5A:
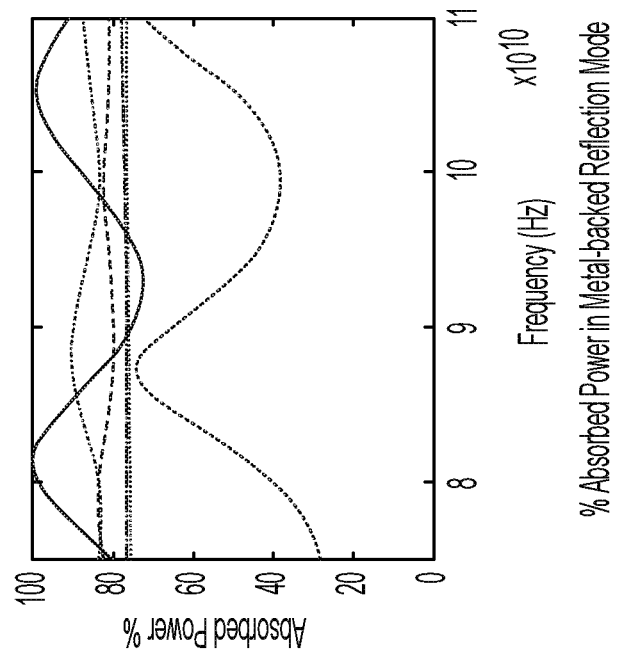
Figure 8:
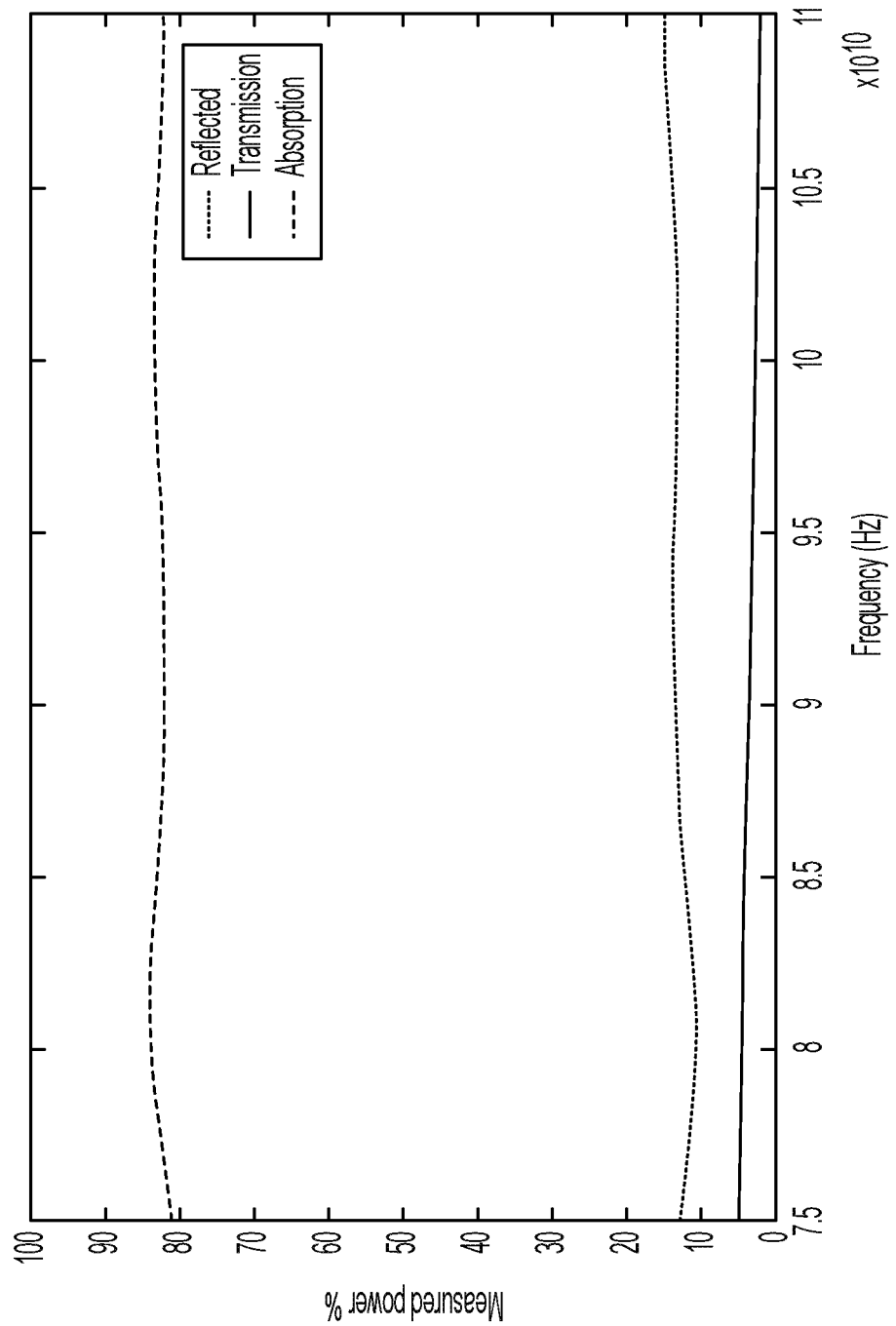
FIG. 8 shows the Percent Power in Transmission Mode for example composition Ex1.2 as a function of frequency when observed in the W-band (75-110 GHz).
Figure 9:
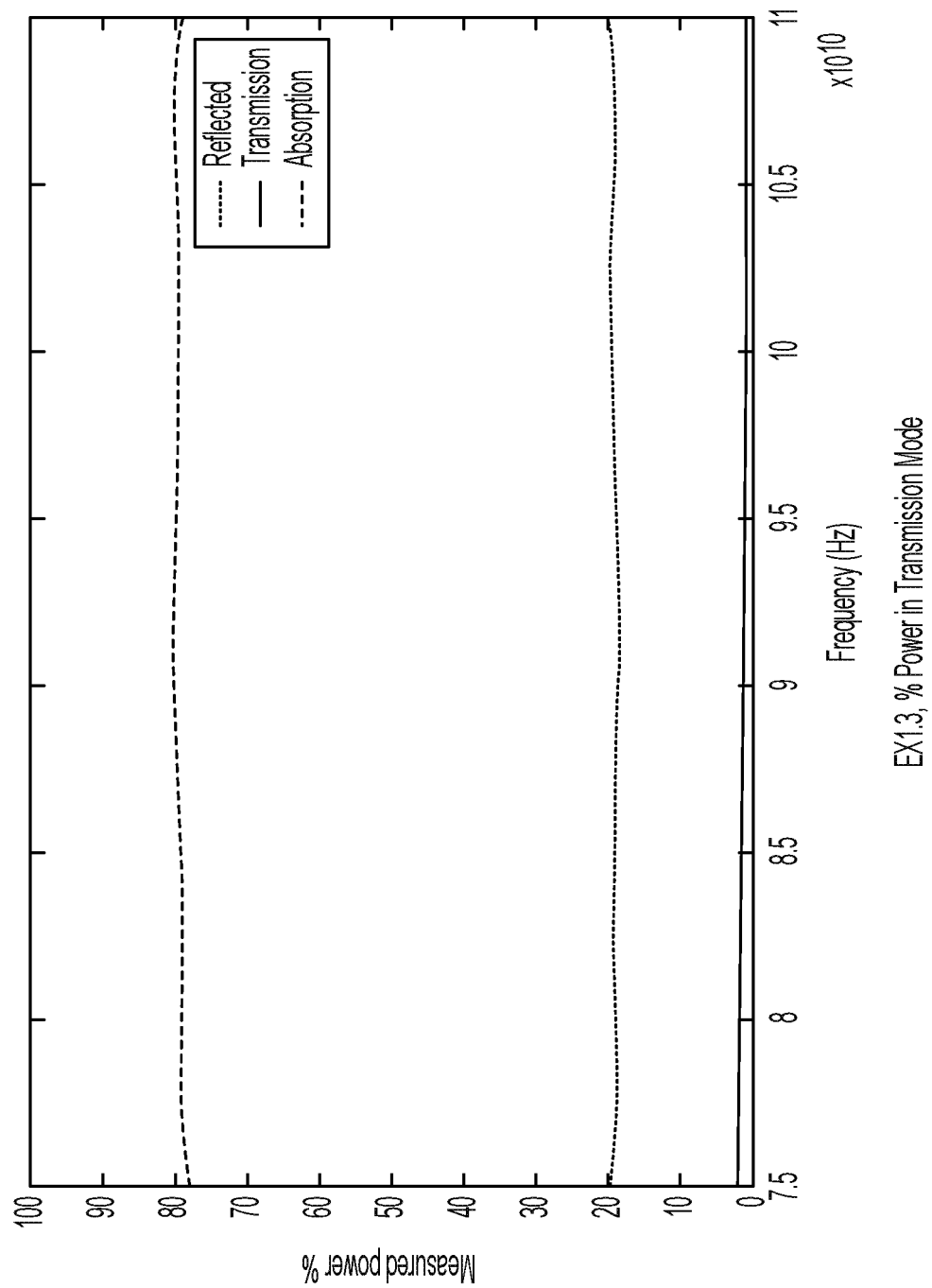
FIG. 9 shows the Percent Power in Transmission Mode for example composition Ex1.3 as a function of frequency when observed in the W-band (75-110 GHz).
Figure 10:
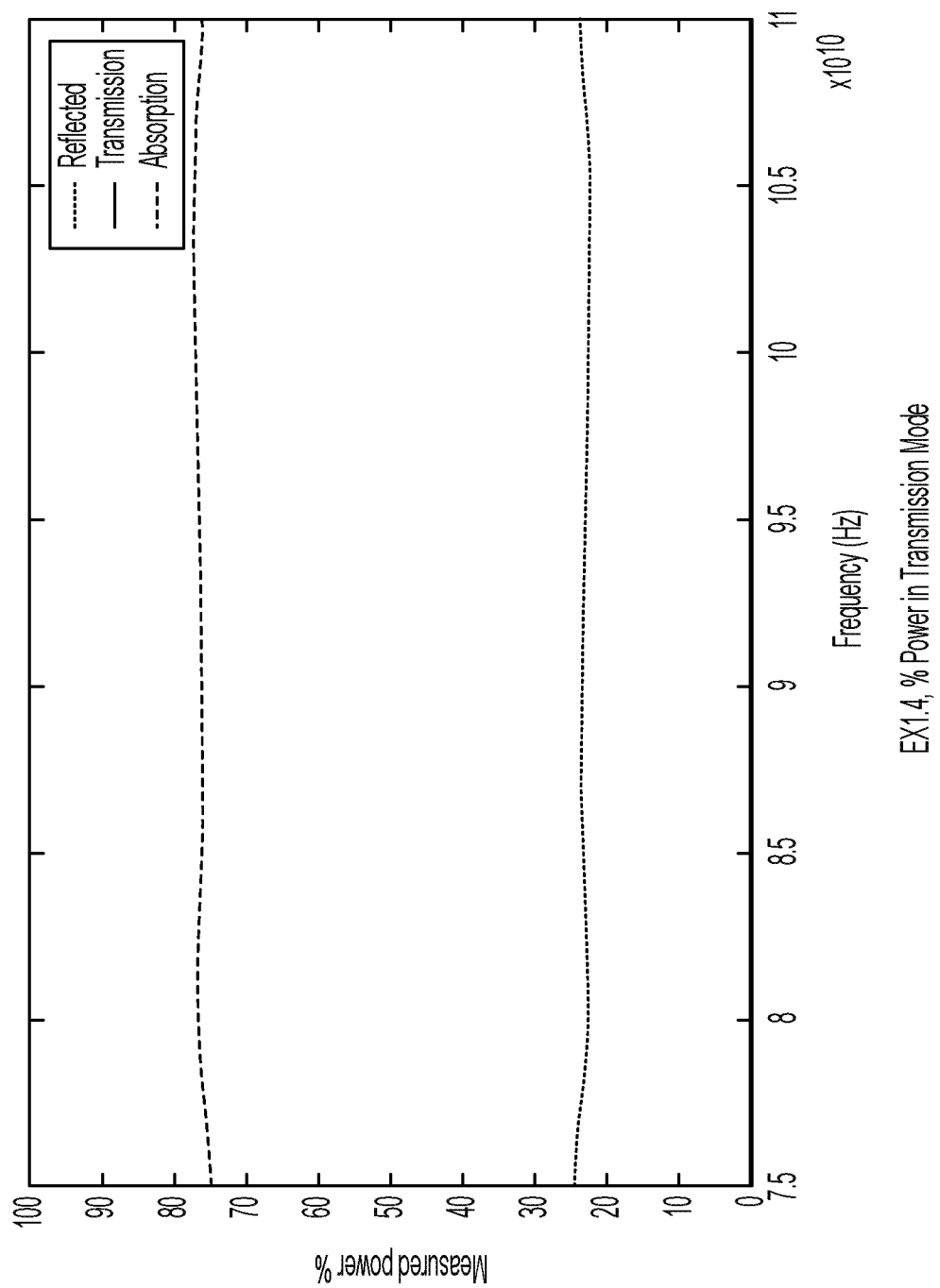
FIG. 10 shows the Percent Power in Transmission Mode for example composition Ex1.4 as a function of frequency when observed in the W-band (75-110 GHz).
Figure 11:
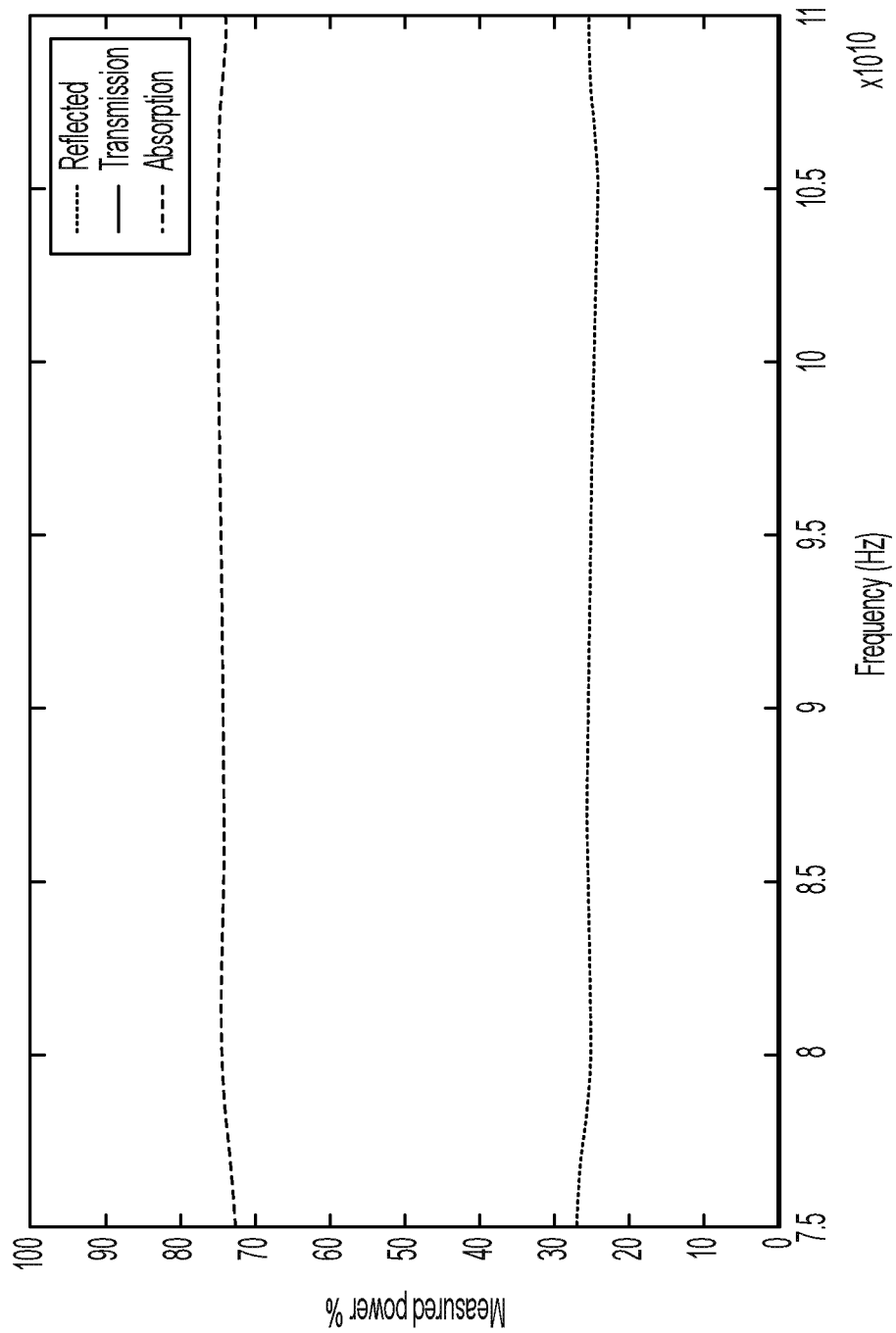
FIG. 11 shows the Percent Power in Transmission Mode for example composition Ex1.5 as a function of frequency when observed in the W-band (75-110 GHz).

Return Loss in Metal-backed Reflection mode is shown in FIG. 4, and Percent Absorbed Power in Metal-backed Reflection mode and in Transmission mode are shown in FIGS. 5A and 5B, respectively. As FIG. 1B depicts, in the case of samples evaluated in Metal-backed Reflection mode a metallic plate (aluminum, stainless steel, or similar) is placed between the material under test and the receiving antenna (Antenna 2 in FIG. 1B) to block any energy transmission through the sample, thus preventing any radiation emitted by Antenna 1 to reach Antenna 2. In this measurement mode, since transmission through the sample has been almost completely eliminated by the addition of a highly microwave reflecting metallic sheet behind the sample, only radiation absorbed by the material and radiation reflected off the material are measured. The presence of the metallic plate will redirect back into the material radiation that would otherwise have been lost by transmission through the material, and some of this reflected energy will be absorbed back into the material thus increasing the amount of Reflection (or Return) Loss. FIG. 4 shows the amount of reflection (in dB) that is lost (or absorption that is gained, no transmission) when a metallic plate is used behind the sample to block the transmission of radiation through the sample. This graph also shows those specific frequencies at which the reflection lost (or absorption gained) goes through a maximum. A Return Loss of −30 dB, for example, is equivalent to a 99.9% absorption efficiency (transmission is zero because of the presence of the metal plate). Similarly, a Return Loss of −20 dB is equivalent to a 99% absorption efficiency.

FIGS. 5A and 5B show the Percent Absorbed Power in Metal-backed Reflection mode and in Transmission mode, respectively, for the compositions of the disclosure. As these graphs show, the amount of radiation absorbed by a given composition at a given frequency is generally higher when it was measured using the Metal-backed Reflection mode compared with the same measurements performed using the Transmission mode. This result is consistent with the explanation presented above as in the Metal-backed Reflection mode case additional absorption is provided by the presence of the metal plaque which redirects energy that would otherwise have been lost back into the sample for secondary absorption.

Figure 12:
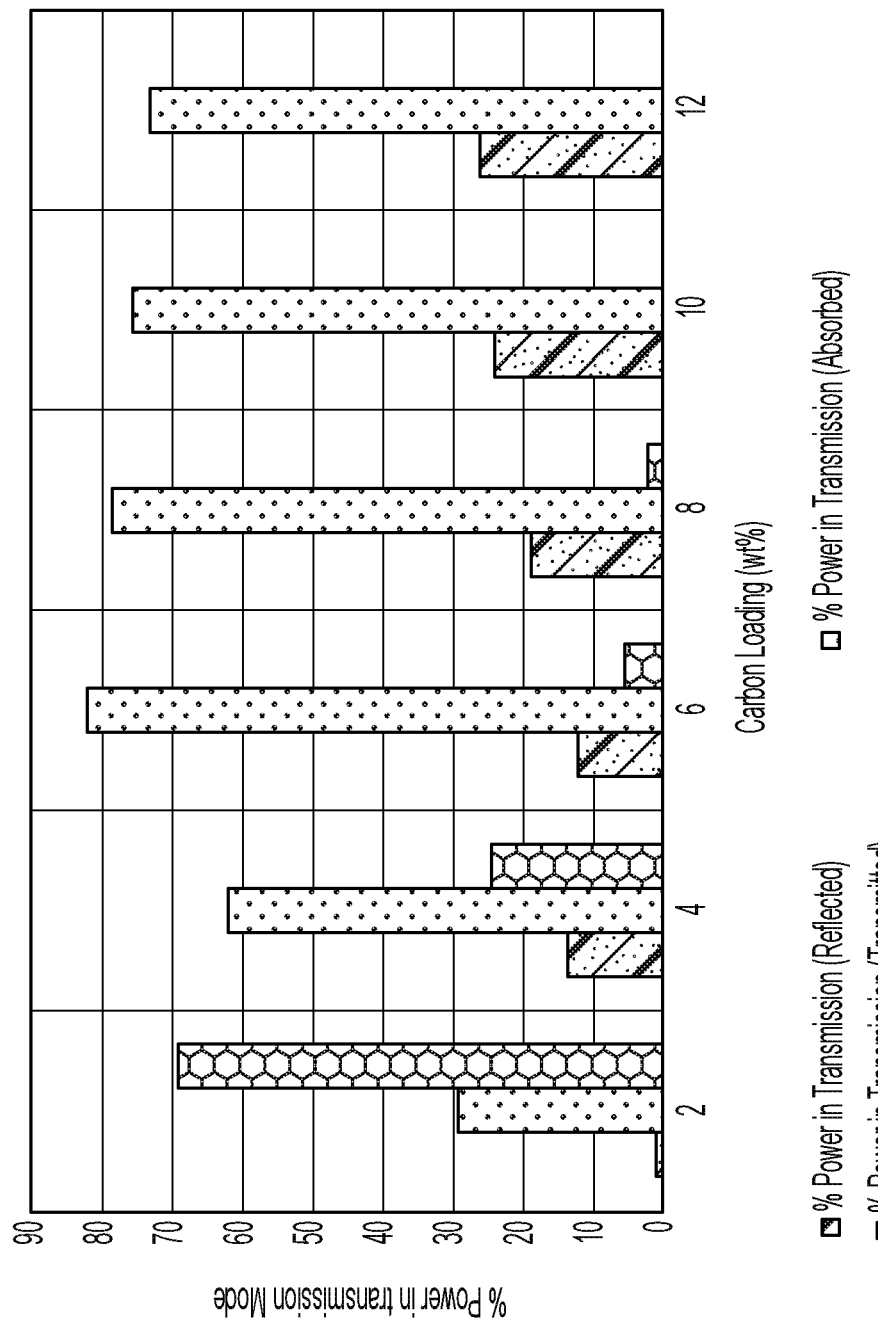
FIG. 12 shows the Percent Power in Transmission Mode for the example and comparative compositions as a function of carbon loading when observed at 77 GHz.

FIGS. 6-11 show the Absorbed, Reflected and Transmitted Percent Power as measured in Transmission mode for the comparative and example compositions. The Absorbed, Reflected and Transmitted Percent Power measured in Transmission mode for these compositions as a function of carbon loading at 77 GHz is shown in FIG. 12. Percent Reflection and Percent Transmission can both be calculated directly from the measured values of the Scattering parameters $S_{11}$ (reflection) and $S_{21}$ (transmission), both complex numbers having real and imaginary parts, and obtained using a vector network analyzer. Percent Absorption cannot be measured directly, so it is calculated for each frequency as the difference between 100% (total amount of incoming radiation impinging on the sample) and the sum of Percent Reflection and Percent Transmission.

In many applications, it is desirable to maximize Percent Absorbed Power, and to minimize Percent Reflected Power and Percent Transmitted Power when measurements are made using the Transmission mode. From the data in FIG. 12 obtained at 77 GHz frequency, it is observed that as carbon content increases the amount of power transmitted through the sample decreases as more carbon particles are available to trap microwave radiation inside the sample thus allowing less energy from reaching the receiving antenna. Similarly, as carbon content increases the amount of power reflected off the sample increases as the material becomes more electrically conductive and behaves dielectrically more as a microwave reflecting metal than a microwave transmitting plastic. The graph of Percent Absorbed Power measured in Transmission mode plotted in terms of the carbon black present in the composition shows an unexpected trend. As this graph shows, the amount of power absorbed by the composition increases at the beginning when the amount of carbon added to the formulation is relatively low (2 and 4 wt %), and goes through a maximum when the concentration of carbon is around 6 wt %. Moreover, an increase in the concentration of carbon above around 6 wt % produces materials with a decreasing ability to absorb microwave energy of 77 GHz frequency. Therefore, the observations made at 77 GHz suggest that: (a) a maximum in microwave Absorbing Efficiency would exist in the range of carbon black investigated (2 wt % to 12 wt %); (b) this maximum would occur at between 4 wt % and 8 wt % of carbon loading; and (c) the amount of energy absorbed in this concentration range would be almost 83%, which is totally unexpected.

From the experimental results obtained in the examples and comparative examples of this disclosure the following observations regarding the dielectric properties of these compositions at frequencies between 75 and 110 GHz were made:
The real part of the complex permittivity (dielectric constant) was between about 2 and 10;
The imaginary part of the complex permittivity (dielectric loss) was between about 0.05 and 5;
Attenuation was between about −2 dB/cm and −100 dB/cm;
Shielding Effectiveness was between about 0.5 dB and 50 dB;
The microwave Absorbed power measured in Transmission mode was between about 20% and 90% of the incoming radiation;
Increasing the amount of ENSACO® 360 G carbon black in the formulation increased both the real and imaginary parts of the material's complex permittivity;
Increasing the amount of ENSACO® 360 G carbon black in the formulation increased both the Attenuation Constant and the Total Shielding Effectiveness;
The amount of power Transmitted by the material at 77 GHz decreased from about 70% at 2 wt % of carbon black to a fraction of 1% at 12 wt % carbon black; and
The amount of power Absorbed by the material at 77 GHz increased from about 30% at 2 wt % of carbon black to about 73% at 12 wt % carbon black, going through a maximum of 83% at around 6 wt % of carbon black.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects can be combined with each other in various combinations or permutations. The scope of the disclosure should be determined with reference to the appended claims, along with the full scope of equivalents to which such claims are entitled.

What is claimed is:
1. A thermoplastic composition comprising:
(a) from about 82 wt % to about 92 wt % of a thermoplastic resin comprising from about 65 wt % to about 75 wt % poly(phenylene ether) and from about 15 wt % to about 20 wt % polystyrene; and
(b) from about 4 wt % to less than 8 wt % of a carbon-based filler, wherein the carbon-based filler has a specific surface area of at least 650 square meters per gram (m²/g), and an Oil Absorption Number of at least 250 milliliter per 100 gram (ml/100 g) as tested in accordance with ASTM D2414,
wherein
the composition has a dielectric constant ε' of between 3.5 and 10 and a dissipation loss ε" of between 0.25 and 5, as measured at a frequency of between about 75 gigahertz (GHz) and about 110 GHz, a ⅛-inch-thick molded sample of the composition exhibits a Percent Absorbed Power measured in Transmission mode of at least 80% when observed according to a Free Space method at a frequency of 77 GHz, and
the combined weight percent value of all components does not exceed 100 wt %, and all weight percent values are based on the total weight of the composition.

2. The composition according to claim 1, wherein the carbon-based filler has a specific surface area of from 650 m$^2$/g to 1500 m$^2$/g as determined in accordance with ASM D3037 and an Oil Absorption Number of from 250 ml/100 g to 500 ml/100 g as determined in accordance with ASTM D2414.

3. The composition according to claim 1, wherein the poly(phenylene ether) comprises polyphenylene oxide (PPO).

4. The composition according to claim 1, wherein the composition further comprises from about 1 wt % to about 10 wt % of an impact modifier component.

5. The composition according to claim 4, wherein the impact modifier component comprises styrene-ethylene-butylene-styrene.

6. The composition according to claim 1, wherein the composition further comprises from 0.01 wt % to about 5 wt % of a polyethylene polymer.

7. The composition according to claim 1, wherein the composition has an Attenuation Constant of between about −5 decibels per centimeter (dB/cm) and −110 dB/cm at a frequency of from about 75 GHz to 110 GHz as determined according to the Free Space Method.

8. The composition according to claim 1, wherein the composition has a Total Shielding Effectiveness of between about 5 dB and about 50 dB at a frequency of from about 75 GHz to 110 GHz as determined according to the Free Space Method.

9. The composition according to claim 1, wherein the composition has a microwave Absorbed Power measured in Transmission mode between about 40% to about 90% of incoming radiation at a frequency of from about 75 GHz to 110 GHz as determined according to the Free Space Method.

10. The composition according to claim 1, wherein the composition has a volume electrical resistivity of less than 2.55E+14 Ohm.cm as determined in accordance with the SABIC Method.

11. The composition according to claim 1, wherein the composition further comprises at least one additional carbon-based filler different from the carbon-based filler of element (b).

12. An article comprising the composition according to claim 1.

13. The article according to claim 12, wherein the article comprises an internal or external component of an automotive sensor.

* * * * *